3,177,175
ABLATION-RESISTANT RESINOUS
COMPOSITIONS
William T. Barry, Jr., Lafayette Hills, Pa., assignor to
General Electric Company, a corporation of New York
No Drawing. Filed Dec. 1, 1959, Ser. No. 856,609
4 Claims. (Cl. 260—33.4)

This invention relates to a resinous material, and particularly concerns a resistant plastic composition which has excellent resistance to ablation even when subjected to extreme conditions of gas velocity and temperature.

Various materials have been formulated and tested for use in high temperature service such as in rocket engines, nose cones and the like. Many such materials have been non-castable and are therefore difficult and expensive to manufacture, particularly in large unconventional shapes such as nose cones and the like. The necessity of using high pressure presses and autoclaves with expensive steel molds seriously hinders the development of new sizes and shapes, and makes long production lead times necessary.

Other materials, which are readily castable, have been found to have very poor resistance when exposed to high temperatures and high gas velocities, and even though readily manufactured and formed, such materials are unsatisfactory in service.

Other materials which have been produced and tested have had the drawbacks of high modulus of elasticity, low elongation, and the tendency to exotherm strongly when cured in thick sections. These drawbacks make the material difficult to cast on a metal back-up because the resulting product tends to crack when subjected to low temperature cycling. Other drawbacks encountered in the art heretofore, include a tendency to chip when subjected to manufacturing routine.

It is accordingly an object of this invention to provide a castable material which has excellent ablation performance even when subjected to exceedingly high temperatures and gas velocities.

Still another object is to provide a material of this type which is readily castable, which does not have an unduly high modulus of elasticity, an unduly low elongation, or an undue tendency to exotherm strongly when cured in thick sections, and which can be cast directly on to a metal substructure.

Still another object is to provide a material of the type just discussed, which has a minimum tendency to chip when subjected to manufacture.

Still another object of this invention is to provide a resin which withstands low temperature cycling without cracking when cast in thick sections on a metal backup or insert.

Other objects and advantages of this invention will further become apparent hereinafter.

In accordance with this invention, a novel castable ablation material is formulated of approximately three weight equivalents of a resin known as epoxy novolac which comprises the reaction product of epichlorohydrin with a linear phenol formaldehyde resin, approximately 1–3 weight equivalents of an anhydride of an acid selected from the group consisting of adipic, polyadipic, pimelic, polypimelic, suberic, polysuberic, azelaic, polyazelaic, sebacic, maleic, chloromaleic, succinic, methyl succinic, phthalic, endomethylene tetrahydrophthalic, and methyl Nadic, and about ½–2½ weight equivalents of a mono or di alkyl ester or a mixture of mono and di esters of orthophosphoric acid, the alkyl group containing from 1–12 carbon atoms.

The terms "weight equivalents" and "weight equivalent parts" as used herein are intended to mean parts by weight which are proportional to the equivalent weight of the compound, as distinguished from its molecular weight. The equivalent weight is the molecular weight divided by the number functional groups per molecule. For each compound, the number of functional groups per molecule may be determined readily from the nature of the molecule. For example, epoxy novolac may have three glycidyl groups which contain the reactive epoxy group, and therefore the number of functional groups per molecule (or functionality) would be three. With respect to the anhydride, one acid anhydride reacts with one epoxy group to form a polyester, and if this has one anhydride group its functionality is one.

Epoxy novolac polymer is a resin of the formula

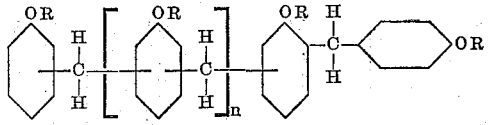

where R is selected from the group consisting of hydrogen and glycidyl. Within the scope of this invention, about 3–10 glycidyl groups are present per molecule, and about 3–10 phenyl ether groups per molecule are present. The integer $n$, in the formula above, therefore is the range of 1–8. All such resins falling within the scope of the foregoing definition are, for the sake of brevity, hereinafter referred to as epoxy novolac polymer.

The acid anhydrides which are suitable in accordance with this invention are those selected from the group consisting of adipic, polyadipic, pimelic, polypimelic, suberic, polysuberic, azelaic, polyazelaic, sebacic, maleic, chloromaleic, succinic, methyl succinic, phthalic, endomethylene tetrahydrophthalic, and methyl Nadic. Methyl Nadic anhydride is also known as methylbicyclo [2·2·]heptene-2, 3-dicarboxylic anhydride isomers.

Referring to the mono or di alkyl ester or mixture of mono and di esters of orthophosphoric acid, the alkyl group is preferably butyl. More specifically, the n-butyl group is preferred.

In addition to the foregoing ingredients, it is optional in accordance with this invention to add a flexibilizer in the form of polypropylene glycol in a molecular weight of approximately 425. This may be present in a quantity, in gram moles of from 0 to about 1, assuming that the epoxy novolac is present in an amount of about 3 epoxide gram equivalents. In some cases, no flexibilizer is needed, as for example when the acid anhydride is a polysebacic anhydride having an average molecular weight of about 2,000, and a degree of polymerization from about 2–20. Such polysebacic anhydride produces very flexible resins with high elongation but having excellent ablation characteristics, even without the inclusion of a flexibilizer. However, use of the two together gives maximum flexibility. Polyethylene glycol may also be used as a flexibilizer, but is used in a much lesser amount, preferably about ½ the amount of polypropylene glycol.

Likewise, other glycols in small amounts may be incorporated.

Example 1

The following table illustrates eleven formulations which were prepared, and gives the results that were obtained thereby. Under the heading "Ablation Rates," two columns appear, one of which gives the results when the material was subjected to a water stabilized arc at 17,000° F., producing a heat flux of 2,000 B.t.u. per square foot per second of energy, and reaching a Mach value of .5–.6 for the rate of mass flow of the gas. The other column, headed "Linde Torch," is a test wherein a torch temperature of 5,200° F. is achieved, with a 1,500 B.t.u. per square foot per second heat flux, and reaching a Mach value of 1.6.

The first three compositions specified above were found to fail rather prematurely as distinguished from formulations 5 and 6, which had exceedingly good ablation resistance. This serves to illustrate the importance of providing more than about ¼ equivalent of the butyl phosphoric ester. In each of the above examples, the acid anhydride was methyl Nadic anhydride, or methyl-bicyclo[2·2·1]heptene-2, 3-dicarboxylic anhydride.

Example 2

The following formulations have excellent ablation characteristics, as compared with the successful formulations in Example 1. They differ in their physical and mechanical characteristics.

TABLE 2

| Glycidyl Phenol Formaldehyde Resin | | | Phosphoric Acid Ester | | Acid Anhydride | |
|---|---|---|---|---|---|---|
| No. of Phenyl groups per molecule | Average No. of glycidyl groups per molecule | (Epoxide) weight equivalent parts | Type | (Acid) weight equivalent parts | Type | Weight Equivalent Parts |
| 3.0 | 3.0 | 3 | n-Butyl | ½ | Adipic | 1 |
| 5.2 | 4.2 | 3 | ----do---- | 2 | Methyl Nadic | 2 |
| 3.5 | 3.3 | 3 | ----do---- | 1 | Sebacic | 3 |
| 4.0 | 3.8 | 3 | Methyl | ½ | Suberic | 1½ |
| 9.8 | 9.1 | 3 | Ethyl | ¾ | Methyl Nadic | 2½ |
| 3.4 | 3.3 | 3 | n-Propyl | 1½ | Maleic | 3 |
| 3.8 | 3.7 | 3 | ----do---- | 2 | Azelaic | 3 |
| 3.5 | 3.4 | 3 | n-Butyl | 2 | Pimelic | 1½ |
| 3.2 | 3.2 | 3 | ----do---- | 2 | 50/50 methyl Nadic/sebacic | 1½ |
| 4.2 | 4.1 | 3 | ----do---- | 1¼ | Chloromaleic | 1½ |
| 4.4 | 4.3 | 3 | Amyl | 1 | Sebacic | 2 |
| 4.5 | 4.2 | 3 | Hexyl | ½ | Methyl succinic | 2 |
| 6.1 | 5.8 | 3 | Heptyl | 1¾ | Phthalic | 2½ |
| 6.0 | 5.8 | 3 | Octyl | 1½ | Suberic | 2½ |
| 5.3 | 5.0 | 3 | Nonyl | 1½ | Phthalic | 2½ |
| 8.2 | 7.6 | 3 | n-Butyl | 2½ | Methyl Nadic | 1½ |
| 6.4 | 6.2 | 3 | ----do---- | ½ | Azelaic | 1 |
| 3.2 | 3.2 | 3 | ----do---- | 1 | Pimelic | 1 |
| 4.3 | 4.0 | 3 | Dodecyl | 1 | Phthalic | 1 |
| 3.2 | 3.2 | 3 | Ethyl | ½ | 50/50 methyl Nadic/sebacic | 3 |
| 3.2 | 3.2 | 3 | Methyl | ½ | Methyl Nadic | 3 |
| 4.2 | 4.1 | 3 | Undecyl | ½ | Maleic | 3 |
| 5.2 | 5.1 | 3 | Decyl | ½ | Adipic | 3 |

TABLE 1

| Formulation No. | Epoxy Novolac (weight equivalent parts) | Mono n-butyl Ester Phosphoric Acid (weight equivalent parts) | Methyl Nadic Anhydride (weight equivalent parts) | Flexibilizer Polypropylene Glycol, m.w. 425 (moles) | Standard ½″ diameter cylinder—Ablation Rates | |
|---|---|---|---|---|---|---|
| | | | | | Water Arc (gram/sec.) | Linde Torch (gram/sec.) |
| 1 | 3 | 0 | 3 | 0 | .22 | .40 |
| 2 | 3 | 0 | 2 | 0 | .22 | .40 |
| 3 | 3 | ¼ | 2 | 0 | .210 | .35 |
| 4 | 3 | ½ | 2 | 0 | .140 | .09 |
| 5 | 3 | 1 | 2 | 0 | .120 | .06 |
| 6 | 3 | 1½ | 1½ | ¼ | .120 | .09 |
| 7 | 3 | 2 | 1 | ¼ | .120 | .09 |
| 8 | 3 | 2 | 3 | ¼ | .120 | .12 |
| 9 | 3 | 1 | 2 | ¼ | .115 | .07 |
| 10 | 3 | 1 | 2 | ½ | .110 | .07 |
| 11 | 3 | 1 | 2 | 1 | .110 | .12 |
| 12 | 3 | 1 | 3 | 0 | .10 | .06 |
| 13 | 3 | 2½ | 1½ | 0 | .11 | .13 |

The ablation rates reported in the above table are for a standard ½ inch diameter cylinder, exposed directly to the flame conditions specified above, and specify the number of grams lost per second due to ablation.

Example 3

The following table illustrates that a glycol flexibilizer may be incorporated into compositions in accordance with this invention.

TABLE 3

| Glycidyl Phenol Formaldehyde Resin | | | Phosphoric Acid Ester | | Acid Anhydride | | Flexibilizer |
|---|---|---|---|---|---|---|---|
| No. of Phenyl groups per molecule | Average No. of glycidyl groups per molecule | Weight Equivalent Parts | Type | Weight Equivalent Parts | Type | Weight Equivalent Parts | (Polypropylene glycol except where noted) (moles) |
| 3.0 | 3.0 | 3 | n-Butyl | ½ | Adipic | 1 | *¼ |
| 5.2 | 4.2 | 3 | do | 2 | Methyl Nadic | 2 | 1 |
| 3.5 | 3.3 | 3 | do | 1 | Sebacic | 3 | ½ |
| 4.0 | 3.8 | 3 | Methyl | ½ | Suberic | 1½ | ¾ |
| 9.8 | 9.1 | 3 | Ethyl | ¾ | Methyl Nadic | 2½ | 1 |
| 3.4 | 3.3 | 3 | n-Propyl | 1½ | Maleic | 3 | ¼ |
| 3.8 | 3.7 | 3 | do | 2 | Azelaic | 3 | *½ |
| 3.5 | 3.4 | 3 | n-Butyl | 2 | Pimelic | 1½ | ¾ |
| 3.2 | 3.2 | 3 | do | 2 | Methyl Nadic | 1½ | 1 |
| 4.2 | 4.1 | 3 | do | 1¼ | Chloromaleic | 1½ | ¼ |
| 4.4 | 4.3 | 3 | Amyl | 1 | Sebacic | 2 | ½ |
| 4.5 | 4.2 | 3 | Hexyl | ½ | Methyl succinic | 2 | ¾ |
| 6.1 | 5.8 | 3 | Heptyl | 1¾ | Phthalic | 2½ | 1 |
| 6.0 | 5.8 | 3 | Octyl | 1½ | Suberic | 2½ | ¼ |
| 5.3 | 5.0 | 3 | Nonyl | 1½ | Phthalic | 2½ | ½ |
| 8.2 | 7.6 | 3 | n-Butyl | 1½ | Methyl Nadic | 1 | ¾ |
| 6.4 | 6.2 | 3 | do | ½ | Azelaic | 1 | 1 |
| 3.2 | 3.2 | 3 | do | 1 | Pimelic | 1 | ¼ |
| 4.3 | 4.0 | 3 | Dodecyl | 1 | Phthalic | 1 | *½ |
| 3.2 | 3.2 | 3 | Ethyl | ¼ | | 3 | ¾ |
| 3.2 | 3.2 | 3 | Methyl | ½ | Methyl Nadic | 3 | 1 |
| 4.2 | 4.1 | 3 | Undecyl | ½ | Maleic | 3 | *¼ |
| 5.2 | 5.1 | 3 | Decyl | ½ | Adipic | 3 | ¾ |

*Polyethylene glycol.

*Example 4*

A novolac phenolic resin is prepared by reacting 1 mol. of phenol with 0.75 mol. of aqueous formaldehyde in the presence of a mineral acid. After the appropriate reaction time, the cook is neutralized and excess water and unreacted materials are stripped off under heat and vacuum to obtain a low molecular weight polymer having on the average 3½ or more phenol groups per molecule (DP=degree of polymerization=3½). This resin is then dissolved in ephichlorohydrin (5–10 moles per phenol group) and treated with a strong base to obtain the polyglycidyl either with 3½ or more glycidyl groups per polymer molecule and an epoxide equilavent of 175. This resin is then used in the following formulations appearing in Examples 5–12 and will be designated as Resin I.

*Example 5*

(1) 525 g. (3 equivalents) Resin I
(2) 106 g. (¼ mole-½ equivalent) of polypropylene glycol having an average molecular weight of 425
(3) 360 g. (2 equiv.) of methyl Nadic anhydride
(4) 80 g. of the mono n-butyl ester of phosphoric acid (1 equiv.)
(5) 5 ml. benzyl dimethylamine It is desirable though not necessary to combine 1 and 2 separately from 3 and 4, all at a temperature of 80° C. When 1 and 2 are combined with 3 and 4 and 5 is added, a slight exotherm takes places and the temperature rises to 90–95° C. The mix is deaerated under vacuum, poured into open molds and cured in an oven for 16 hours at 125° C. A clear rigid resin with a room temperature tensile strength of greater than 10,000 p.s.i. and a tensile modulus of $5 \times 10^5$ p.s.i. is obtained. Outstanding ablation performance is obtained, as is shown in Table 5 which follows Example 12.

The product was cast into the form of a small rocket nozzle. This nozzle was attached to the plenum chamber of an air stabilized arc. The plasma of the arc at a temperature of about 12,000° F. with a heat flux of about 2,000 B.t.u./ft.² sec. was led through the nozzle. The material was found to have exceptional resistance to erosion by this plasma and upon inspection the inside surface was found to be lined with a dense strong carbonaceous layer.

This material was made up into an aerodynamic test sample and placed in an arc-driven wind tunnel. The tunnel velocity was Mach 4 and the heat flux to the sample was 40–50 B.t.u./ft.² sec. These conditions simulate long-time low heat flux high altitude re-entry, which is required for bringing man safely back into the atmosphere from space. The material performed exceptionally well.

*Example 6*

Increasing the polypropylene glycol in Example 5 to 213 g. (½ mole or 1 equivalent) while maintaining the other components constant produces a clear semi-rigid resin having a room temperature tensile strength of 5,000 p.s.i. and a tensile modulus of $2.5 \times 10^5$ p.s.i., again with excellent ablation performance as shown in Table 5.

This material, as well as others, may be completely set and ground up, and then used as filler for itself by mixing with the ingredients prior to polymerization. This was subsequently formed into a nose cone over a metal back-up, using a troweling (pottery-type) technique, with excellent results.

*Example 7*

Replacing all of the methyl Nadic anhydride in Example 5 with 368 g. (2 equiv.) of a polysebacic anhydride (average mol. wt. 2000) while maintaining the other components constant leads to a clear very flexible resin with low tensile modulus and an elongation of over 10% while still maintaining outstanding ablation performance (see Table 5). This material was cast on aluminum back-up and cycled down to minus 100° C. without cracking. It was then tested in a rocket exhaust and gave excellent ablation performance results.

*Example 8*

Replacement of the 2 equivalents of methyl Nadic anhydride in Example 2 by 2 equivalents of each of the following acid anhydrides lead to resins having ablation performance comparable to Example 5. The anhydrides are maleic, succinic, methyl succinic, chloromaleic, phthalic, endomethylene tetrahydrophthalic, polyadipic, polysuberic, polypimelic and polyazelaic. (Results in Table 5.)

*Example 9*

Replacement of the 2 equivalents of methyl Nadic anhydride in Example 5 by 2 equivalents of each of the following acid anhydrides lead to resins having very poor performance in a high temperature supersonic environment and are to be excluded from the spirit of this invention. They are dodecenyl succinic, tetrapropenyl succinic, tetrahydrophthalic, hexahydrophthalic and a dimethyl, butenyl substituted tetrahydrophthalic.

This example is included to illustrate that the performance of the good materials is not general and not predictable in the light of present knowledge.

With respect to the foregoing Examples 5–9 inclusive, benzyl dimethylamine may be replaced by other tertiary amines which catalyze the reaction of carboxylic acids and acid anhydrides with epoxy groups or they may be left out entirely to slow down the reaction rate. This also applies to the other examples.

*Example 10*

Replacement of 3 equivalents of Resin I in Example 5 by 3 equivalents of an epoxylated novolac of lower degree of polymerization (2.5 phenyl groups per molecule) and functionality (2.5 glycidyl groups per molecule) leads to materials having higher rates of ablation (see Table 5).

*Example 11*

Replacement of 3 equivalents of Resin I in Example 5 by 3 equivalents of the diglycidyl ether of bis-phenol acetone (functionality of 2) leads to very poor materials having high rates of ablation (see Table 5).

*Example 12*

Replacement of 3 equivalents of Resin I in Example 5 by 3 equivalents of 3,4-epyxy-6-methylcyclohexylmethyl-3,4-epoxy-6-methylcyclohexane-carboxylate (functionality of 2) leads to materials exhibiting very poor ablation properties (see Table 5).

In all of the foregoing examples, four testing methods were used as follows:

(1) Water Stabilized Arc, wherein exceedingly hot plasma is produced by containing an electric arc in a swirl of water. The text specimen is then placed in this plasma.

(2) Shrouded Air Arc, wherein exceedingly hot plasma is produced by heating air with an electric arc. The plasma flows through a nozzle and is directed over the test specimen.

(3) Linde Blowpipe F.S.J. 3, wherein exhaust flame is produced by an oxy-kerosene torch. The test specimen is placed in the flame.

(4) Malta Rocket, wherein exhaust flame emanates from a liquid oxygen-alcohol rocket. The test specimen is placed in this exhaust flame.

TABLE 4
CHARACTERISTICS OF TESTING METHODS

|  | Temp., °F. | Heat Flux, B.t.u./ft.²/sec. | Mach No. |  |
|---|---|---|---|---|
| Water Stabilized Arc | 15,000 | 2,000 | Sub-sonic | Right cylinder 0.5″ diameter. |
| Shrouded Air Arc | 8,000 | 1,400 | do | Cylinder 0.677″ diameter, curved testing surface. |
| Linde Blowpipe F.S.J. | 5,200 | 1,500 | 1.6 | Right cylinder 0.5″ diameter. |
| Malta Rocket | 5,400 | 1,200 | 2.6 | Conical: 2.5″ base diameter; Hemispherical test surface 0.750″ diameter. |

Radius of curvature=0.5″.

TABLE 5
RESULTS—LOSSES OF MATERIAL

| Material | Linde Blowpipe F.S.J., 3 grams/10 sec. weight loss | Malta Rocket, inches/10 sec. length loss | Shrouded Air Arc, grams/10 sec. weight loss | Water Stabilized Arc, grams/10 sec. weight loss | Remarks |
|---|---|---|---|---|---|
| Phenolic Resin 40%+Nylon Cloth 60%. | 1.3 | 0.40 | 1.6 | 1.0 | Two best presently available phenolic resin systems. |
| Phenolic Resin 40%+High Silica Cloth (refrasil) 60%. | 0.70 | *0.15 | 2.1 | 2.2 | |
| Example 2 | 0.65 | | 1.2 | 1.2 | Consistently excellent performance in a wide range of high temperature plasmas. |
| Example 3 | 0.70 | *0.23 | 1.2 | 1.1 | |
| Example 4 | 0.70 | | 1.1 | 1.0 | |
| Example 5 | 0.70 | | | 1.2 | Average values for all the anhydrides mentioned in Example 5. |
| Example 6 | 3.5 | | | 1.3 | Average values for anhydrides in Example 6. Blowpipe values of 3.5 and high indicate very poor performance. |
| Example 7 | 1.6 | | | 1.6 | |
| Example 8 | 3.0 | | | 1.6 | |
| Example 9 | 3.3 | | | 2.3 | |

*Although length losses are dissimilar, weight losses are about equal since Phenolic-Refrasil has a density of 1.75 g./cc. vs. 1.22 g./cc. for the resin of Example 3.

As is well known in the art, suitable fillers which do not adversely affect the ablative properties of this material can be added to change certain of its physical properties such as mechanical strength, density, and thermal conductivity. Although this invention has been described with reference to specific test procedures and method steps, it will be appreciated that the invention is directed to the combinations of materials in specific proportions as specified in the claims, and is not limited to methods of preparation or of testing. Moreover, it will be understood that this invention embraces equivalents of the compounds that are specifically set forth, all as appears in the appended claims.

The following is claimed:

1. A resinous material consisting essentially by weight of approximately 3 weight equivalent parts of a resin of the formula

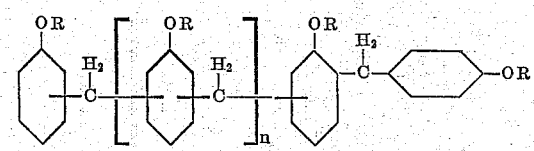

where R is selected from the group consisting of hydrogen and glycidyl, wherein from 3 to 10 glycidyl groups are present per molecule, and wherein $n$ represents an integer from 1 to 8, about 1 to 3 weight equivalents of an anhydride of an acid selected from the group consisting of adipic, polyadipic, pimelic, polypimelic, suberic, polysuberic, azelaic, polyazelaic, subacic, maleic, chloromaleic, succinic, methyl succinic, phthalic, endomethylene tetrahydrophthalic, and methylbicyclo[2·2·1]heptene-2,3-dicarboxylic acids and about ½ to 2½ weight equivalents of a material selected from the group consisting of mono and dialkyl ester of orthophosphoric acid, said alkyl group containing from 1 to 12 carbon atoms, said weight equivalents being equal to the molecular weight of the constituent composition divided by the number of functional groups per molecule.

2. A low pressure moldable ablation material consisting essentially by weight of approximately 3 weight equivalents of a resin of the formula

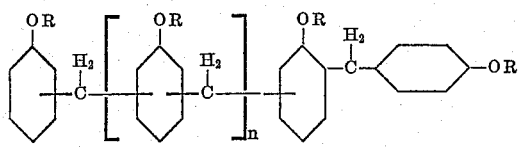

wherein R is selected from the group consisting of hydrogen and glycidyl, wherein from 3 to 10 glycidyl groups are present per molecule, and wherein n represents an integer from 1 to 8, about 1 to 3 weight equivalents of methylbicyclo[2·2·1]heptene-2,3-dicarboxylic anhydride isomer, and about ½ to 2½ weight equivalents of a material selected from the group consisting of mono and dialkyl ester of orthophosphoric acid, said alkyl group containing from 1 to 12 carbon atoms, said weight equivalents being equal to the molecular weight of the constituent composition divided by the number of functional groups per molecule.

3. A castable ablation material consisting essentially by weight of approximately 3 weight equivalents epoxy novolac polymer comprising the reaction product of epichlorohydrin with linear phenol formaldehyde resin in the presence of a strong base, said polymer having from about 3 to about 10 phenyl ether groups per molecule and having from about 3 to about 10 glycidyl groups per molecule, approximately ½ to 2½ weight equivalents of the mono n-butyl ester of orthophosphoric acid, and about 1 to 3 weight equivalents of methylbicyclo[2·2·1]heptene-2,3-dicarboxylic anhydride isomer, said weight equivalents being equal to the molecular weight of the constituent composition divided by the number of functional groups per molecule.

4. A resinous material consisting essentially by weight of approximately 3 weight equivalent parts of a resin of the formula

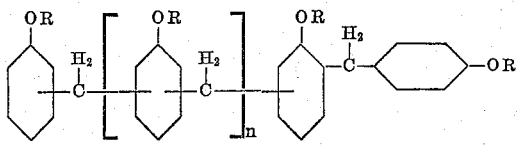

where R is selected from the group consisting of hydrogen and glycidyl, wherein from 3 to 10 glycidyl groups are present per molecule, and wherein n represents an integer from 1 to 8, about 1 to 3 weight equivalents of an anhydride of an acid selected from the group consisting of adipic, polyadipic, pimelic, polypimelic, suberic, polysuberic, azelaic, polyazelaic, subacic, maleic, chloromaleic, succinic, methyl succinic, phthalic, endomethylene tetrahydrophthalic, and methylbicyclo[2·2·1]heptene-2,3-dicarboxylic acid, about ½ to 2½ weight equivalents of a material selected from the group consisting of mono and dialkyl ester of orthophosphoric acid, said alkyl group containing from 1 to 12 carbon atoms, and for the purpose of imparting flexibility about ¼ to 1 mole of a glycol selected from the group consisting of polypropylene glycol, polyethylene glycol, 1,3 propane diol, 2,2 dimethylpropane diol, 2,2 diethyl propane diol, 1,4 butane diol, 1,5 pentane diol, 1,6 hexane diol of molecular weights ranging from monomer to about 2,000, said weight equivalents being equal to the molecular weight of the constituent composition divided by the number of functional groups per molecule.

References Cited by the Examiner

UNITED STATES PATENTS

| | | | |
|---|---|---|---|
| 2,587,477 | 2/52 | Hunter | 260—45.7 |
| 2,609,351 | 9/52 | Taat | 260—59 |
| 2,716,099 | 8/55 | Bradley | 260—47 |
| 2,849,418 | 8/58 | Fang | 260—47 |
| 2,863,853 | 12/58 | Pschorr | 260—47 |
| 2,897,175 | 7/59 | Howe et al. | 260—59 |
| 3,063,965 | 11/62 | Colclough | 260—59 |
| 3,127,373 | 3/64 | Guttag | 260—59 |

OTHER REFERENCES

Lee et al.: Epoxy Resins, pages 51–52, McGraw-Hill Book Co. (1957).

WILLIAM H. SHORT, *Primary Examiner.*

R. L. CAMPBELL, L. D. ROSDOL, *Examiners.*